Feb. 12, 1935.   H. I. LEA   1,990,831
DISTILLATION PROCESS AND APPARATUS
Filed Aug. 5, 1933   2 Sheets-Sheet 1

Inventor
Henry I. Lea.
Attorney.

Feb. 12, 1935.  H. I. LEA  1,990,831
DISTILLATION PROCESS AND APPARATUS
Filed Aug. 5, 1933  2 Sheets-Sheet 2

Inventor
Henry I. Lea.

Attorney.

Patented Feb. 12, 1935

1,990,831

UNITED STATES PATENT OFFICE 1,990,831

DISTILLATION PROCESS AND APPARATUS

Henry I. Lea, Santa Monica, Calif.

Application August 5, 1933, Serial No. 683,774

12 Claims. (Cl. 202—64)

On February 16th, 1932, a Patent No. 1,845,159 issued to me on Distillation system, the subject matter of this patent dealing with a new method of distillation and apparatus for carrying out the method, in which substantial heat economies are effected by surrounding an evaporator by a condenser and preheating the feed liquid by passing it first through the condenser and then into the evaporator. In an improvement Patent No. 1,889,254, granted November 29th, 1932, on Still, I showed certain improvements on the original invention, particularly with reference to the evaporator. Then, following this second invention I made certain additional improvements, again directed for the most part to the evaporator, as set out in my co-pending application on Stills and evaporation apparatus, Ser. No. 637,067, filed October 10, 1932.

I may remark with reference to this last mentioned application, that I there describe an evaporator (surrounded by a condenser as in the previous instance) comprising a vertical series of horizontally extending troughs in end to end continuation, preferably in the form of a substantially spiral trough, heated to vaporize the liquid flowing therethrough. There the vapors are liberated from the troughs immediately upon being generated, and pass directly through a space extending along the evaporator, to contact the condenser.

The present invention may be said to be perhaps most similar to the apparatus disclosed in my copending application, in that I show herein an evaporator in which the liquid is passed through a series of horizontally extending conduits, one above the other, and preferably in the form of a continuous spiral. However, in the present instance the conduit, instead of being in the form of an open trough consists of a pipe, and the vapors, instead of passing from the evaporator instantly as they are formed, remain in the pipe and flow toward its inlet end in a path counter-current to the flow of liquid. Consistent with changes in the evaporator, I have also modified the condenser so that while preferably surrounding the evaporator and serving to condense the vapors and transfer their heat to the feed liquid as before, the condenser now is heat insulated from the evaporator instead of being directly exposed to the space at its outside. It is to be understood that in its broad aspects, the invention is not to be regarded as limited to any particular form of condenser in combination with the evaporator. The illustrated form of condenser, however, has certain preferences and many decided advantages.

The invention embodies numerous additional phases and aspects, but these as well as the more general features mentioned above will be understood to best advantage, and without necessity for further preliminary discussion, from the following detailed description. Reference is had throughout the description to the accompanying drawings, in which:

Fig. 4 is a fragmentary section on line 4—4 of Fig. 1.

Figure 1:
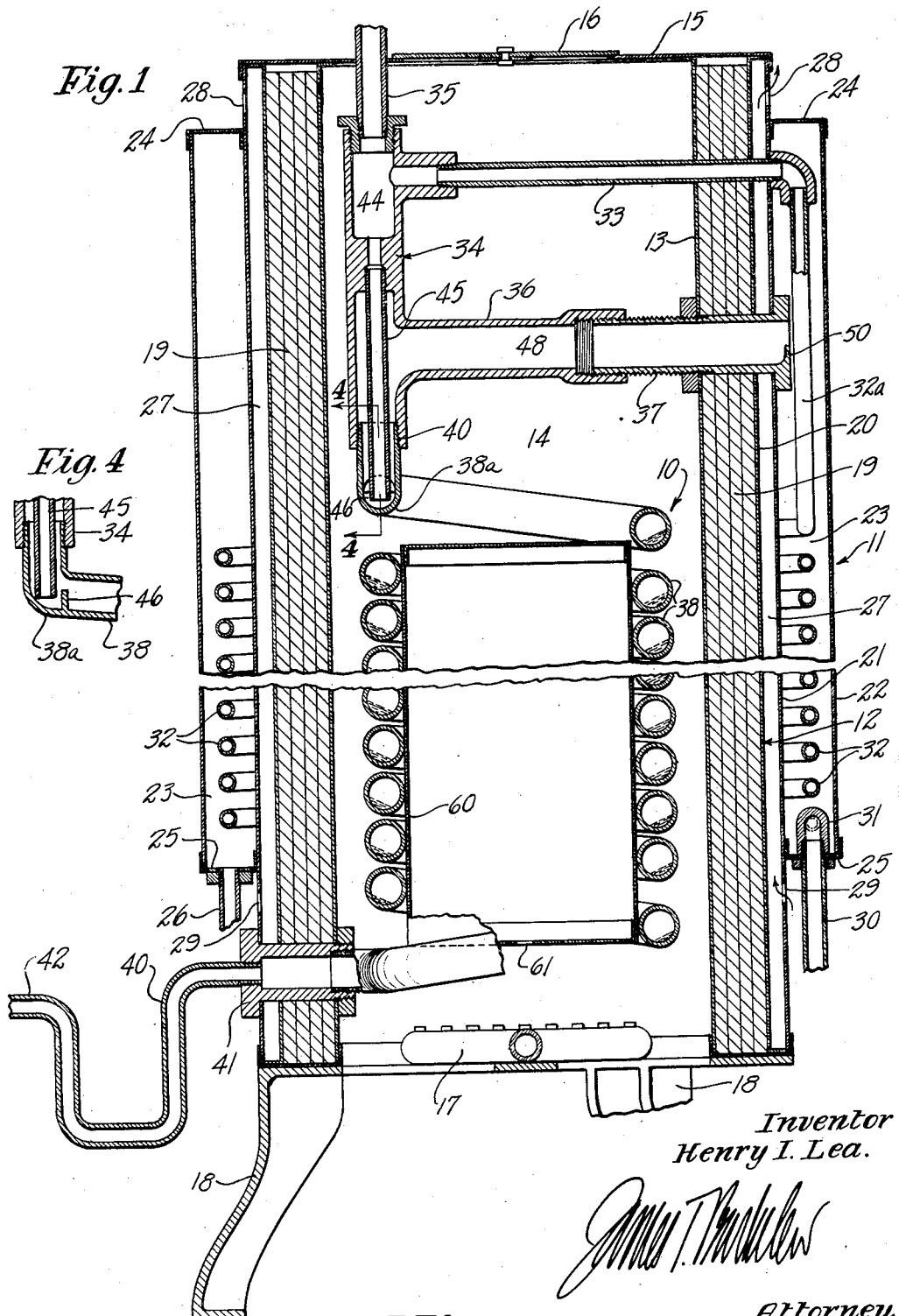
Figure 1 is a vertical section through one form of still made in accordance with the invention and which may be regarded as a preferred embodiment.

Referring first to Fig. 1, the apparatus may be described generally as comprising an evaporator 10 surrounded by a condenser 11, there being a heat insulating medium or wall 12 between the evaporator and the condenser. Liquid to be distilled is passed upwardly through the condenser wherein the liquid is preheated to a predetermined temperature, preferably at or near the boiling point, by vapors liberated from the evaporator. The preheated feed liquid is discharged into the upper end of the evaporator and allowed to gravitate through the latter, the liquid being simultaneously heated and vaporized and the vapors passed into and condensed within the condenser shell. As will hereinafter appear, the residuum and distillate are carried off separately from the evaporator and condenser, respectively. So much for the main parts of the apparatus and their general arrangement.

The evaporator 10 is surrounded by a shell 13 forming a heating chamber 14 enclosed at its upper end by plate 15 provided with a slide damper 16 for controlling the flow of gas used in heating the evaporator coil. Shell 13 may here be regarded as cylindric in shape, and evaporator 10 as being generally circular in cross section, although it is to be understood that in the broad aspects of the invention, these parts may be of any desired cross sectional configuration and size. Liquid passing down through the evaporator is heated by a gas or oil burner 17 installed at the base of the chamber 14. The apparatus is supported on legs 18, and air to support combustion at the burner is taken into the combustion chamber from beneath.

Shell 13 is thoroughly insulated against the escape of heat from the combustion chamber by suitable insulating material 19, which I show to be held in place by an outer sheath or shell 20. The latter, together with the material 19, will hereinafter be referred to as the insulation wall. Condenser 11 may be made in a variety of manners permitting feed liquid to be passed upwardly toward the top of the evaporator and simultaneously preheated by vapors being liberated from the evaporator, and therefore the invention is not intended to be limited to the herein illustrated or any one particular condenser construction. I show, however, a typical form of condenser comprising inner and outer concentric shells 21 and 22 annularly spaced to form a vapor chamber 23. The latter has top and bottom closures 24 and 25, condensate being drained from chamber 23 through outlet 26 extending through the bottom annular wall 25. An annular air space 27 is provided between shell 21 and the insulation wall for the purpose of more effectively insulating the condenser from the heating zone, and to provide for air circulation along the inner wall of the condenser. Vent openings 28 and 29 are formed in shell 20 above and below the condenser proper to promote air circulation, air currents entering at 29 and, upon becoming heated in space 27, rising and passing out through the top openings 28.

Feed liquid is supplied to the condenser through an inlet pipe 30 connecting via fitting 31 with a spiral pipe coil 32 within vapor chamber 23. The upper end 32a of the condenser coil connects with pipe 33 extending through the insulation wall to fitting 34. Also connecting with this fitting is a vent tube 35 extending through top plate 15 of the combustion chamber. Fitting 34 has a right angle extension 36 of somewhat enlarged internal diameter, connected to nipple 37 extending into the vapor chamber 23 of the condenser, part 36 of the fitting and nipple 37 forming the vapor outlet leading from the evaporator to the condenser.

Evaporator 10 consists of a spiral pipe coil 38 made of fairly thin-walled tubing of metal, such as copper, having high heat conductivity. The tubing in coil 38 will be of substantially larger diameter than the condenser coil pipe for the reason that, as will appear more fully hereinafter, the evaporator coil conducts, in addition to the liquid being distilled, the generated vapors. Preferably tubing 38 will be sufficiently large that the liquid passing therethrough will fill but a comparatively small portion of the cross sectional area of the tubing, and will flow in a more or less ribbon-like stream through the convolutions of the coil. Also, regarding the invention broadly, the evaporator tubing need not necessarily be in spiral form, although in view of numerous practical considerations, such as convenience in form and installation as well as compactness, it is preferred that the tubing be in spiral form. The evaporator coil surrounds a shell 60 closed top and bottom except for a small opening 61 in the bottom wall.

The upper end of the evaporator coil connects at 40 with the lower end of fitting 34, the preheated feed liquid passing into the evaporator through this connection. The lower end of coil 38 is connected via bushing 41 with an outlet in the form of a liquid seal 40 which serves to carry off the unvaporized residuum and yet maintain a seal preventing the escape of vapors at the bottom of the evaporator. It will be noted that a smooth passage is afforded the residuum from the bottom of the evaporator through the liquid seal to the outlet 42, so that no opportunity is given the residuum to back up in the evaporator or deposit sedimentary bodies as a result of interruptions or local retardations in flow.

As previously stated, feed liquid supplied through inlet 30 passes upwardly through the spiral condenser coil 32 and, after becoming preheated to a temperature near the boiling point, passes through pipe 33 into the upper interior chamber 44 of fitting 34. It will be understood of course that the feed liquid will be pumped through the condenser under sufficient pressure to enable it to flow through the described course. As a result of preheating, fixed gases and air dissolved in or otherwise carried by the feed tend to liberate from the liquid, and in order that heating and vaporization may occur at highest efficiency, it is necessary that these fixed gases and air be separated from the feed liquid immediately following the preheating stage. Accordingly, I vent chamber 44 to the atmosphere through pipe 35, so that as the preheated liquid passes into the chamber, the gases and air will pass out through the vent. The liquid then flows down through a comparatively small diameter tube 45 terminating within a bend 38a in the upper end of the evaporator coil. In order to preclude the possibility of vapors blowing from the evaporator coil up through tube 45 to the vent, I maintain a liquid seal in the lower end of tube 45 by forming a dam 46 extending a suitable distance above the lower end of the tube and maintaining a liquid body of sufficient depth to seal the latter.

The liquid fed into the upper end of the evaporator coil gravitates through the tubing in a shallow stream and preferably is caused to flow at a substantial velocity, or at a velocity sufficient to prevent the accumulation of sedimentary particles on the wall of the tubing.

That the most ideal conditions favoring high evaporative efficiency and capacities exist in the evaporator, will be readily apparent. Here the thin walled tubes are entirely surrounded and directly contacted by the hot gases, and by reason of their high heat conductivities, the tubes pass the heat to the liquid at extremely high rate. Evaporation capacity and efficiency are further favored very substantially by the liquid being caused to flow at a fairly rapid rate and in a shallow, ribbon-like stream heated uniformly throughout and presenting an evaporation surface of great area in proportion to the depth of the stream.

Vapors liberated from the liquid during its passage through the evaporator coil, are caused to follow a counter path of flow through the space in the tubing above the liquid surface. Condensation of vapors in the evaporator coil cannot of course occur since the vapor contacting walls and tubing are being directly heated by the combustion gas. The vapors pass out of the upper end of the evaporator into space 48, and thence into condenser chamber 23, wherein the vapors condense on coil 32 and on walls 21 and 22 of the chamber. Part of the heat of condensation of the vapors is thus transferred to the feed liquid in quantities sufficient to raise the latter to near boiling temperature; while any remaining heat of condensation is dissipated to the air contacting condenser walls 21 and 22. The condensate, which is the product of the distillation, drains to the bottom of chamber 23 and is led to a storage receptacle (not shown) through outlet 26. A dam 50 is provided in the outlet end of nipple 37 in order that, if for any reason, liquid entrainment should be deposited in chamber 48, such liquid will not be swept into the vapor chamber to contaminate the distillate, but will instead flow back into the evaporator coil.

Figure 2:
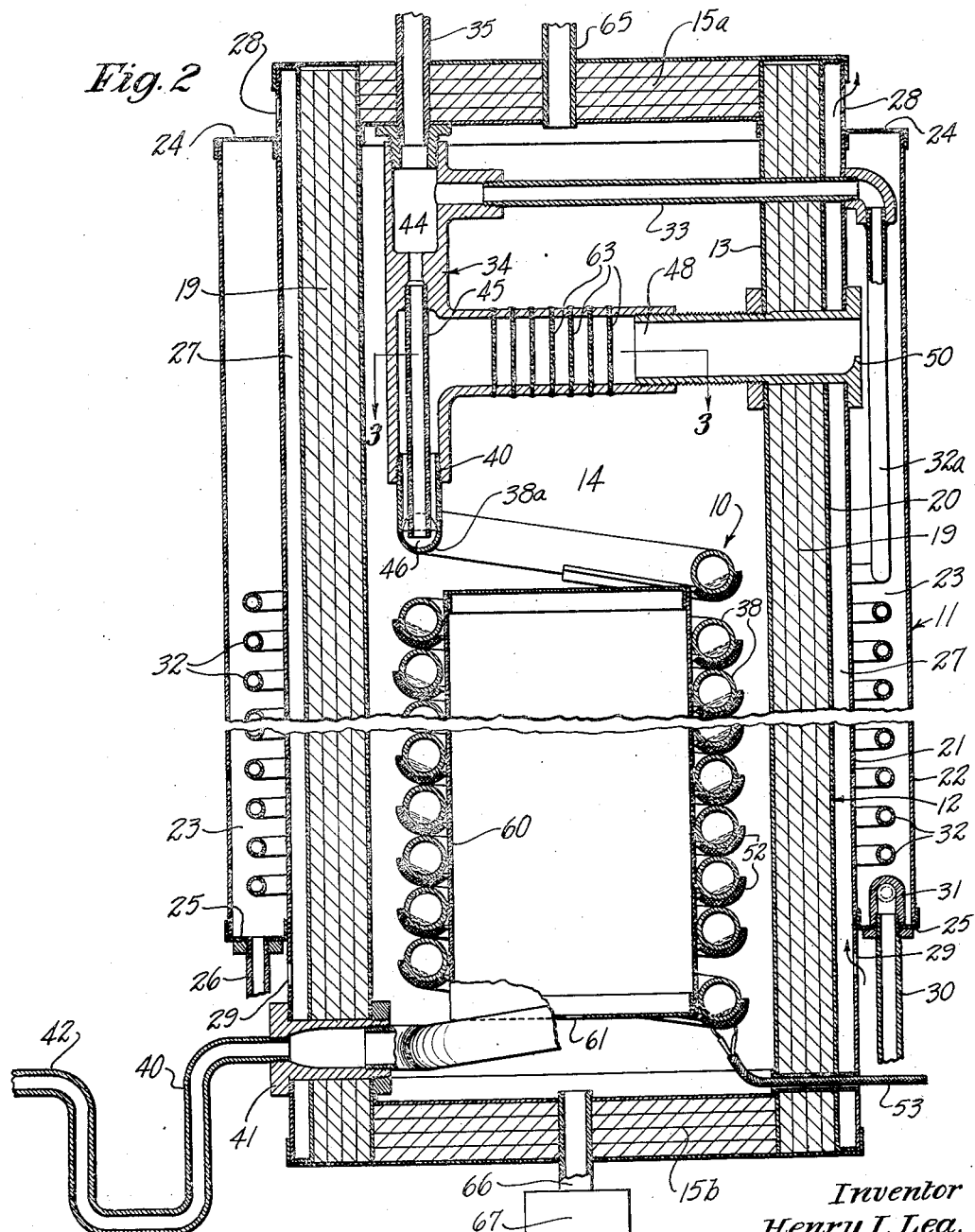
Fig. 2 is a view similar to Fig. 1, illustrating a variational form of the invention.

In Fig. 2 I show a variational form of the invention quite similar to the described embodiment except as to certain modifications made to adapt the apparatus to electrical heating and the addition of separating elements in the vapor line. In this variational form, both the top and bottom of the interior chamber 14 of the apparatus are closed by insulation walls 15a and 15b. The evaporator coil 38, instead of being heated by hot gases, is equipped with an electrical heating element 52 applied to the bottom and outside portions of the tubing in the manner indicated, current being supplied the heating element through lead wires passing at 53 through the wall of the apparatus. Here the evaporator chamber is completely insulated in furtherance of maximum heat economy. This form of the invention is particularly adapted to use where gas heating is unavailable, or at least inconvenient, and has the advantage of being capable of closely accurate control and all around facility in its use.

Figure 3:
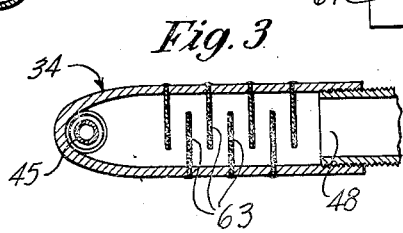
Fig. 3 is a fragmentary section on line 3—3 of Fig. 2.

In order to preclude the possibility of contamination of the distillate by any entrained particles of liquid carried over by the vapors from the evaporator, I may provide, as shown in the variational form, a plurality of baffles 63 located in the vapor passage 48 and arranged in staggered positions as illustrated in Fig. 3. Any liquid particles carried by the vapors will, upon striking the baffles, deposit thereon, drain to the bottom of the vapor passage, and flow back into the evaporator.

The variational form of the invention shown in Figure 2 lends itself very well to heating by the use of steam, in place of electricity. If, for any reason, it should prove desirable to substitute steam as a heating medium in lieu of the resistance heater 52, the latter may be dispensed with and the shell provided with a steam inlet 65 located, for example, in the top wall, and a condensate outlet 66 in the bottom connecting with a steam separator conventionally illustrated at 67. Here extremely even and accurately controlled temperatures may be maintained within the apparatus simply by supplying steam to the chamber 14 at constant predetermined pressure.

In describing the invention thus far, I have had in mind using the apparatus primarily for the purpose of distilling such liquids as fresh water, sea water or the like for the purpose of producing a pure distillate. However, it is recognized that the apparatus is readily adaptable to serve other purposes founded primarily on distillation. For instance, by reason of the fact that during heating and vaporization of the liquid, very precise temperature conditions may be maintained and the physical relation of the liquid and vapor are such that a condition of substantial equilibrium is established, the apparatus is capable of accomplishing quite close fractionation between liquid constituents having varying degrees of volatility. In this connection, the apparatus is readily adaptable for the fractionation of oil, hydrocarbons generally, and other liquids having constituents of different boiling points. Also the apparatus may be used as a concentrator for reducing a liquid to its heavier and less volatile fractions. As a further possibility, I may, by so constructing the apparatus as to withstand more or less high pressures, adapt the same to a flash-type boiler. These, as well as a great number of other possibilities, will be readily apparent to those familiar with this general art.

I claim:

1. In apparatus of the character described, an evaporator comprising an elongated pipe having a series of interconnected horizontally extending portions one above the other, means for feeding liquid to said pipe and for passing the liquid through the pipe in a stream, only partially filling the pipe, means for heating and vaporizing the liquid in said pipe, the vapors being caused to flow through the pipe in a path counter-current to the liquid stream, walls forming a condenser chamber surrounding said pipe, one of said walls being disposed between said pipe and the chamber, and means for conducting the vapors from said pipe to said chamber.

2. In apparatus of the character described, an evaporator comprising an elongated pipe in the form of a vertically extending spiral coil, means for feeding liquid into the upper end of said coil and for passing the liquid down through the coil in a stream, only partially filling the pipe, means for heating and vaporizing the liquid in said pipe, the vapors being caused to flow through the pipe in a path counter-current to the liquid stream, walls forming a condenser chamber surrounding said pipe, one of said walls being disposed between said pipe and the chamber, and means for conducting the vapors from said pipe through the last mentioned wall to said chamber.

3. In apparatus of the character described, an evaporator comprising an elongated pipe contained in a heating chamber, means for feeding liquid to said pipe and for passing the liquid through the pipe in a stream, only partially filling the pipe, means for passing hot gases into said chamber and in contact with the outside of the pipe to heat and vaporize the liquid therein, the vapors being caused to flow through the pipe in a path counter-current to the liquid stream, walls forming a vapor chamber surrounding said pipe and including a wall separating said heating chamber from the vapor chamber.

4. In apparatus of the character described, an evaporator comprising an elongated pipe, means for feeding liquid to said pipe and for passing the liquid through the pipe in a stream, only partially filling the pipe, means for heating and vaporizing the liquid in said pipe, the vapors being caused to flow through the pipe in a path counter-current to the liquid stream, means for conducting the vapors from said pipe separately from the liquid being fed thereto, and means for transferring heat from said vapors to the feed liquid to preheat the latter prior to its delivery to said pipe, the last mentioned means comprising walls forming a closed condenser chamber surrounding said pipe and a vapor conduit leading from the pipe to the condenser chamber.

5. In apparatus of the character described, an evaporator comprising an elongated pipe in the form of a vertically extending spiral coil, means for feeding liquid into the upper end of said coil and for passing the liquid down through the coil in a stream, only partially filling the pipe, means for heating and vaporizing the liquid in said pipe, the vapors being caused to flow through the pipe in a path counter-current to the liquid stream, means for conducting the vapors from said pipe separately from the liquid being fed thereto, means including a condenser enclosing said coil, for transferring heat from said vapors to the feed liquid to preheat the latter prior to its delivery to said pipe, and a liquid and vapor separator between said coil and the condenser.

6. In apparatus of the character described, an evaporator comprising an elongated pipe, means for feeding liquid to said pipe and for passing the liquid through the pipe in a stream, only partially filling the pipe, means for heating and vaporizing the liquid in said pipe, the vapors being caused to flow through the pipe in an unobstructed stream flowing along the top wall of the pipe in a path counter-current to the liquid stream, means for conducting the vapors from said pipe separately from the liquid being fed thereto, and means for transferring heat from said vapors to the feed liquid to preheat the latter prior to its delivery to said pipe, the last mentioned means comprising a feed liquid carrying condenser surrounding said evaporator.

7. In combination, an evaporator comprising an elongated pipe, a condenser surrounding and communicating with said pipe, means for passing feed liquid through the condenser and then into said pipe, said liquid flowing in a stream only partially filling the pipe, means for heating and vaporizing the liquid in said pipe, the vapors being caused to flow through the pipe in an unobstructed stream flowing along the top wall of the pipe counter-current to the liquid stream, and means for passing said vapors to the condenser wherein the feed liquid is preheated by heat transferred from the vapors.

8. In combination, an evaporator comprising an elongated and vertically extending spiral pipe, a condenser extending along opposite sides of and communicating with said pipe, means for passing feed liquid through the condenser and then into said pipe, said liquid flowing in a stream only partially filling the pipe, means for heating and vaporizing the liquid in said pipe, the vapors being caused to flow through the pipe counter-current to the liquid stream, and means for passing said vapors to a chamber wherein the vapors are condensed to preheat the feed liquid, and a wall between said pipe and said chamber.

9. In combination, an evaporator comprising an elongated pipe, a condenser surrounding and communicating with said pipe, said condenser comprising walls forming a vapor chamber and a feed liquid carrying coil within said chamber, one of the vapor chamber walls being disposed between said pipe and said coil, means for passing feed liquid through the condenser and then into said pipe, said liquid flowing in a stream only partially filling the pipe, means for heating and vaporizing the liquid in said pipe, the vapors being caused to flow through the pipe counter-current to the liquid stream, and means for passing said vapors into said vapor chamber in heat transferring relation with the feed liquid in said coil.

10. In combination, an evaporator comprising an elongated and vertically extending spiral pipe, a condenser surrounding and communicating with said pipe, said condenser comprising spaced walls forming a vapor chamber and a feed liquid carrying coil within said chamber, one of the vapor chamber walls being disposed between said pipe and said coil, means for passing feed liquid through the condenser and then into said pipe, said liquid flowing in a stream only partially filling the pipe, means for heating and vaporizing the liquid in said pipe, the vapors being caused to flow through the pipe counter-current to the liquid stream, and means for passing said vapors into said vapor chamber in heat transferring relation with the feed liquid in said coil.

11. In combination, an evaporator comprising an elongated pipe, a condenser surrounding and communicating with said pipe, heat insulating means between said evaporator and the condenser, means for passing feed liquid through the condenser and then into said pipe, said liquid flowing in a stream only partially filling the pipe, means for heating and vaporizing the liquid in said pipe, the vapors being caused to flow through the pipe counter-current to the liquid stream, and means for passing said vapors to the condenser wherein the feed liquid is preheated by heat transferred from the vapors.

12. In apparatus of the character described, an evaporator comprising an elongated pipe, a conduit for feeding liquid to said pipe and for passing the liquid through the pipe in a stream, only partially filling the pipe, means for heating and vaporizing the liquid in said pipe, the vapors being caused to flow through the pipe in a path counter-current to the liquid stream, a shell extending around and above the top of said pipe, said feed liquid conduit extending through the shell, and a separate vapor line leading from said pipe and extending through said shell.

HENRY I. LEA.